United States Patent Office 3,337,436
Patented Aug. 22, 1967

3,337,436
PREPARATION OF BIS(BETA-ALKOXYALKYL) KETONES
Donald M. Fenton, Anaheim, Calif., assignor to Union Oil Company of California, Los Angeles, Calif., a corporation of California
No Drawing. Filed Sept. 21, 1964, Ser. No. 398,836
5 Claims. (Cl. 204—162)

This invention relates to the preparation of bis (beta-alkoxyalkyl) ketones which are useful for a variety of purposes such as solvents and as intermediates in the preparation of bis-alkenyl ketones, which can be readily prepared by pyrolysis of the bis(beta-alkoxalkyl)ketones.

This invention comprises the reaction of an olefin, carbon monoxide and an alcohol in the presence of mercuric ion to yield the bis(beta-alkoxyalkyl)ketone. Coincidence with the formation of the ketone is the reduction of a stoichiometric quantity of the mercuric ion to free mercury metal. The reaction is initiated with a conventional free radical source such as a free radical forming compound or ultraviolet irradiation.

The reaction can be performed under relatively mild conditions including temperatures from about 5° to about 350° C., pressures from about atmospheric to 10,000 p.s.i.g. or more, sufficient to maintain the reactant alcohol in liquid phase.

Preferably, the reaction is initiated in the presence of a free radical source comprising a free radical forming compound which has a half life at least about one hour at 100° C. Once initiated, the reaction is self-propagating and a continuous supply of the free radical initator is not necessary. The reaction can be performed in excess of the alcohol reactant which can suitably serve as the reaction solvent. If desired, however, other solvents hereinafter set forth can also be employed.

In general, any ethylenically unsaturated hydrocarbon can be employed in the reaction. Generally, hydrocarbon olefins having from about 2 to about 12 carbons are employed including the following: ethylene, propylene, butene-1, isobutylene, pentene-1, 1,1-dimethyl propylene, hexene-1, cyclohexene, heptene-1, heptene-2, methylcyclohexene, octene, nonene, decene, dodecene, etc. The aliphatic ethylenically unsaturated hydrocarbons of the aforementioned olefins are the preferred, and of these, the lower molecular weight olefins having from 2 to about 6 carbons are most preferred.

The source of the mercuric ion can suitably be any soluble mercuric salt such as the mercuric carboxylates. In general, mercuric salts of fatty acids having from about 1 to about 16 carbons can be employed and mercuric carboxylates of carboxylic acids having from about 1 to about 6 carbons are preferred. Examples of suitable mercuric carboxylates are: mercuric acetate, mercuric propionate, mercuric butyrate, mercuric pentonate, mercuric laurate, etc.

The reactant alcohol employed can be any primary alcohol corresponding to the particular alkoxy group desired in the ketone. Generally, aliphatic primary monohydroxy alcohols having from 1 to about 25 carbons can be employed to prepare the ketone. Examples of suitable alcohols are, e.g., methanol, ethanol, propanol, butanol, isobutanol, amyl alcohol, isoamyl alcohol, hexanol, isohexanol, heptanol, isoheptanol, 3-methyl hexanol-1, lauryl alcohol, 3,4-diethyl heptanol-1, 4-ethyl hexanol, etc. Preferably, low molecular weight alcohols having 1 to about 12 carbons are employed.

The remainder of the reaction medium can be any organic solvent that is liquid at the reaction condition and is inert to the reactants, e.g., inert to mercuric salts, carbon monoxide, alcohols and the ketone product. The particular alcohol employed as a reactant can be used in excess and thus comprise the reaction solvent. This is preferred since it simplifies the product recovery steps. If desired, however, other organic solvents can be employed including various ethers such as methyl ethyl ether, diethyl ether, diisopropyl ether, diisoamyl ether, diethylene glycol diethyl ether, tetraethylene glycol dimethyl ether, etc.

Various esters can also be employed as the solvent, e.g., methyl acetate, ethyl acetate, n-propyl propionate, isopropyl acetate, ethyl propionate, n-butyl butyrate, secbutyl acetate, isobutyl acetate, ethyl-n-butyrate, n-butyl acetate, isoamyl acetate, n-amyl acetate, glycol diformate, furfural acetate, isoamyl n-butyrate, ethyl acetyl acetate, diethyl oxalate, glycol diacetate, isoamyl isovalerate, n-dibutyl oxalate, etc.

The saturated hydrocarbons can of course be used as suitable inert solvents, e.g., pentane, hexane, heptane, octane, decane, dodecane, kerosene, naphtha, etc.

As previously mentioned, the reaction is performed under relatively mild conditions including temperatures from about 0° to about 250° C.; preferably from about 20° to about 200° C. The reaction can be performed under any desired reaction pressure from about atmospheric to 10,000 p.s.i.g. or greater. Generally, sufficient pressure should be employed at the reaction temperature to maintain liquid phase conditions, i.e., maintain the chosen reaction solvent or alcohol in liquid phase. Such pressures can be from atmospheric to about 100 atmospheres.

The reaction can be performed in a continuous or batchwise fashion. The alcohol and, optionally, reaction solvent, can be charged to the reaction zone together with the mercuric salt. Thereafter, the olefin and carbon monoxide can be introduced in a sequential order or simultaneously. In general, ratios of carbon monoxide to olefin that can be employed include from about 10:1 to about 1:10 and preferably from about 4:1 to about 1:4 and most preferably from 1:1 to 2:1, corresponding to the stoichiometric consumption of the reactants. In a continuous operation, the olefin and carbon monoxide are continuously introduced together with makeup reaction medium comprising the reacted alcohol and necessary quantity of mercuric salt. A portion of the liquid reaction product is continuously withdrawn from the reaction zone and treated to recover the reaction product.

When operating in a discontinuous or batchwise fashion, the reactants are charged to the reaction zone and after a sufficient reaction time has ensued, as evidenced by a pressure drop or appearance of mercury, the reaction is discontinued and the product recovered.

The cooled reaction product can be readily decanted to separate the organic products from the mercury and the former can be treated to recover the product of the reaction, i.e., the bis (alkoxyalkyl)ketone in any conventional manner. With most products, simple recovery by distillation at subatmospheric pressures can be effective; this distillation can be enhanced by the use of solvents or azeotrope forming materials in conventional extractive distillation or azeotropic distillation. If desired, the product can also be recovered by solvent extraction alone; however, any product recovery apparent to those skilled in the art can be used.

The reaction is initiated in the presence of a free radical which can be generated by a free radical generator which is added to the reactants or by any other suitable means such as ultraviolet light irradiation of the reactants. Generally, conventional free radical generators are employed and such generators should have a finite half life at 100° C., preferably a half life of at least one hour at said temperature so that the free radical generator is not immediately consumed at the reaction temperature. The free radical generator can comprise any compound that, when heated to the aforementioned reaction temperature, will undergo homolytic bond scission to yield at least one fragment containing an atom having an unpaired electron in its outer or valence orbit. The chemistry of these free radical generators is a well established art and any of the art known free radical generators can be used in my invention provided that they have a minimum half life of about one hour at 100° C., thus insuring that they are not entirely decomposed before the desired reaction temperature is achieved. The free radicals so formed do not combine with any of the products and, therefore, their chemical identity is not significant to the reaction; instead, I believe that the free radicals cause a one electron change (reduction) of mercuric ions and this change results in the formation of the ketone products rather than carbonates which are formed in the absence of any free radical source. Examples of suitable free radical generators include cumene hydroperoxide, dicumyl peroxide, t-butyl hydroperoxide, di-t-butyl peroxide, t-butyl perbenzoate, 1-azocylohexane carbonitrile, 1-azocyclobutane carbonitrile, azobis(alpha-phenyl)propane, etc. A sufficient quantity of the free radical generator is employed to initiate the reaction which, once initiated, is self-propagating. Concentrations of a free radical generator that can be initially employed are from about 0.01 to about 5 weight percent based on the total liquid reaction medium.

Alternative to, or in combination with, the aforementioned free radical generators, the reactants can be irradiated with ultra-violet light in the conventional manner to form free radicals in situ. A mercury quartz lamp can be used as the source of radiation and to avoid absorption of large quantities of the radiation by the reaction vessel, a quartz reaction vessel or a quartz window in the reaction vessel can be used.

The following example will serve to illustrate a mode of practicing my invention:

*Example*

A 300 milliliter bomb was charged with 31 grams mercuric acetate, 20 grams yellow mercuric oxide, 1 gram di-tert-butyl peroxide and 100 grams n-butanol. The bomb was closed and pressured with ethylene to 600 p.s.i.g., then heated to 80° C. and 600 p.s.i.g. additional pressure of carbon monoxide was added. The bomb was then heated to 120° C. and held at that temperature for one hour, then to 200° C. and held at that temperature for 2 hours. At the end of the reaction period the bomb was cooled, opened and the contents were filtered to separate the metallic mercury.

The organic liquid was distilled to remove water, n-butanol, acetic acid and 4 grams n-butyl-beta-n-butoxy propionate and 7 grams of bis(beta-n-butoxyethyl)ketone, boiling point 140°–150°/3 mm. mercury pressure, refractive index at 25° C. of 1.4442. The infrared spectrum was consistent with the structure for bis(beta-n-butoxyethyl) ketone. An analysis showed 68.3 and 11.7 percent carbon and hydrogen respectively, compared to 67.8 and 11.3 percent calculated for these values.

The foregoing example is solely intended to illustrate a mode of practicing my invention and to demonstrate the results obtained therewith. This example is not to be construed as unduly limiting of the invention but rather, it is intended that the invention be defined by the method steps and their equivalents set forth in the following claims:

I claim:
1. The preparation of a bis(beta-alkoxyalkyl)ketone from monoxide, an aliphatic primary alcohol having about 1 to 25 carbons and a hydrocarbon olefin having from about 2 to 12 carbons that comprises contacting carbon monoxide, said olefin and said alcohol at a temperature between about 0° and about 250° C. with sufficent pressure to maintain liquid phase conditions, said contacting being in the presence of a mercuric carboxylate having 1 to about 16 carbons and an organic compound that undergoes homolytic bond scission at the reaction temperature to yield a free radical fragment containing an atom having an unpaired electron in its outer orbit, said organic compound also having a half life at 100° C. of about one hour.

2. The preparation of claim 1 wherein said alcohol has from about 1 to 12 carbons, said olefin has from 2 to about 6 carbons and said mercuric carboxylate has from about 1 to 6 carbons.

3. The preparation of claim 2 wherein said mercuric carboxylate is mercuric acetate and said olefin is ethylene.

4. The preparation of claim 1 wherein said temperature is from 20° to 200° C.

5. The preparation of a bis(beta-alkoxyalkyl)ketone from carbon monoxide, an aliphatic primary alcohol having from about 1 to 25 carbons and a hydrocarbon olefin having from about 2 to 12 carbons that comprise contacting carbon monoxide, said olefin and said alcohol at a temperature between about 0° and 250° C. with sufficient pressure to maintain liquid phase conditions, said contacting being in the presence of a mercuric carboxylate having about 1 to 16 carbons and irradiating said reactants during said contacting with ultra-violet light.

References Cited
UNITED STATES PATENTS

| | | | |
|---|---|---|---|
| 2,650,253 | 8/1953 | Rust et al. | 260—597 |
| 3,282,832 | 11/1966 | Hey et al. | 204—162 |

JOHN H. MACK, *Primary Examiner.*

H. S. WILLIAMS, *Assistant Examiner.*